No. 636,274. Patented Nov. 7, 1899.
G. W. MORSE.
WHEEL.
(Application filed Feb. 23, 1898.)
(No Model.)
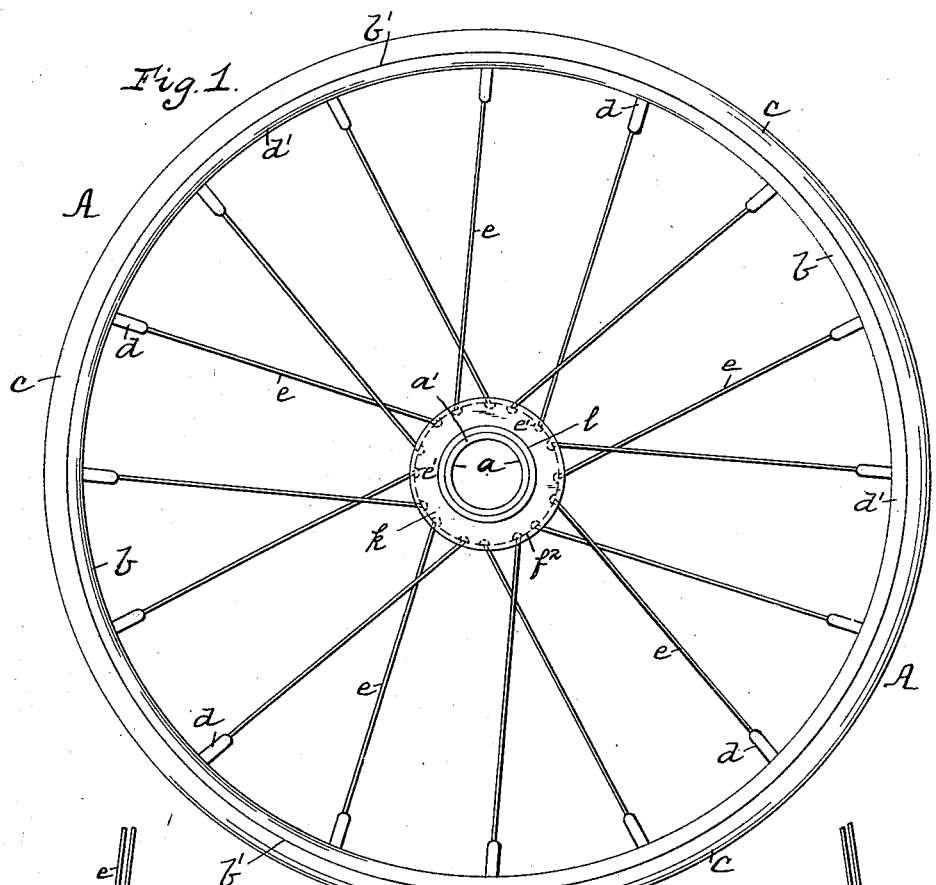
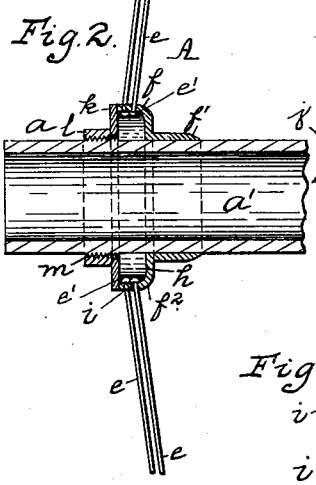
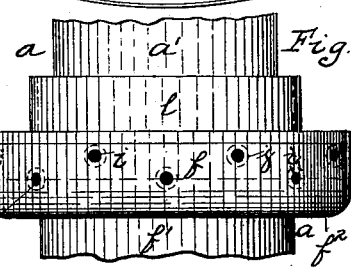
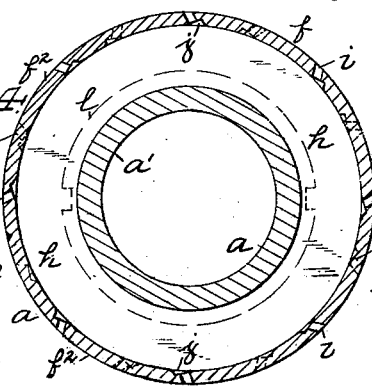
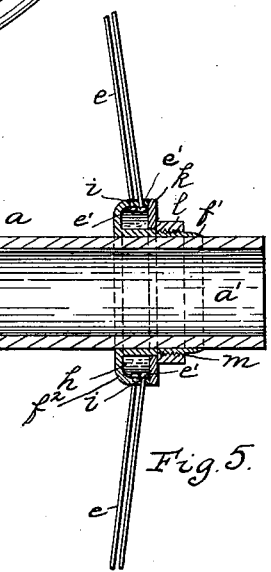

UNITED STATES PATENT OFFICE.

GEORGE W. MORSE, OF PITTSBURG, PENNSYLVANIA, ASSIGNOR OF ONE-HALF TO JOHN H. CROSKEY, OF SAME PLACE.

WHEEL.

SPECIFICATION forming part of Letters Patent No. 636,274, dated November 7, 1899.

Application filed February 23, 1898. Serial No. 671,230. (No model.)

*To all whom it may concern:*

Be it known that I, GEORGE W. MORSE, a citizen of the United States, and a resident of Pittsburg, in the county of Allegheny and State of Pennsylvania, have invented certain new and useful Improvements in Wheels, of which the following is a specification.

My invention relates to wheels, and has especial reference to wheels provided with metallic spokes.

The object of my invention is to provide a wheel in which the spokes can be quickly, easily, and cheaply secured to the hub in such manner as to greatly prevent the entrance of dirt or other foreign matter to the parts.

Another object is to provide a wheel in which the hub and collars thereon can be easily cleaned and one in which the spokes are so arranged within the hub as to allow play for the same when subjected to end thrust, as well as to enable the spokes to have direct pull on the hub; and a still further object is to provide a wheel in which the spokes can be easily and rapidly assembled in the hub, as well as one in which the parts can be readily disconnected without disturbing the spokes.

My invention consists, generally stated, in the novel construction, combination, and arrangement of parts, as hereinafter more specifically set forth and described, and particularly pointed out in the claims.

To enable others skilled in the art to which my invention appertains to construct and use the same, I shall now describe the same more fully, referring to the accompanying drawings, in which—

Figure 1 is a side view of a wheel, showing my invention. Fig. 2 is an enlarged longitudinal section of a portion of the hub. Fig. 3 is an enlarged plan view of a portion of the hub, showing the spokes removed. Fig. 4 is an enlarged sectional view of the flange of the hub on the line 4 4 of Fig. 3. Fig. 5 is an enlarged longitudinal section of a portion of the hub, showing another form of my invention.

Like letters of reference indicate like parts in each of the views.

My invention is illustrated as applied to an ordinary pneumatic-tired wheel, but it is evident that the same can be used upon any form of wheel having metallic spokes.

The wheel A has the ordinary hub $a$ and the rim or felly $b$, provided with the tire $c$. The felly $b$ has on its inner face $d'$ threaded sleeves $d$ for holding one end of the spokes $e$, which have heads at their other ends for holding them in the hub $a$. The hub $a$ is formed of an ordinary pipe or tube $a'$ and is provided with an annular collar $f$ on each end, preferably secured to the hub by means of a brazed joint between the portion $f'$ and the hub. The collar $f$ is bent outwardly, so as to form a shoulder and an annular lip portion $f^2$, thus providing an annular space $h$ between the portion $f^2$ and the hub for the ends of the spokes. The lip portion $f^2$ has two rows of openings $i$ therethrough, said openings not extending radially through the lip portion, but at an angle or out of line with the center of the hub. If desired, seats $j$ may be formed around the inner ends of the openings $i$ for the heads $e'$ of the spokes. Fitting loosely around the hub $a$ and against the end of the lip portion $f^2$ is the plate or washer $k$, held against said lip portion by means of a nut $l$ engaging with a threaded portion $m$ of the hub.

In Fig. 5 is shown another form of my invention, in which the tubular part $f'$ of the collar $f$ extends toward the end of and is brazed to the hub $a$, and the washer $k$ fits loosely around said tubular part and is held against the lip $f^2$ by the nut $l$ engaging with a threaded portion of the part $f$.

The manner of constructing and assembling my improved wheel is as follows: The collar $f$, with its lip $f^2$, is secured in place upon the hub $a$, as described, and the spokes $e$ are inserted through the openings $i$ in the lip $f^2$ and screwed into the threaded sleeves $d$ in the felly until the heads $e'$ of the spokes engage the seats $j$, the inclination of the openings permitting the insertion of the spokes in this manner. The washer $k$ is then placed around the hub $a$ against the lip $f^2$ and the nut $l$ screwed to place against the washer, so pressing it tightly to place and securing the parts firmly together.

It will thus be seen that my improved wheel is cheap, durable, and simple in construction, and the parts are less liable to break and get out of order than the ordinary devices. The parts of the wheel can be easily and rapidly assembled and taken apart and when in position present a plain unbroken surface on the hub and at the same time form a tight joint, so as to prevent the entrance of dust or foreign matter into the hub. All end thrusts on the spokes are taken up and the spokes permitted to move within their openings, thereby obviating the bending or breaking of the spokes, and direct pulls on the heads of the spokes are allowed without the least possible injury to the wheel. It will also be seen that the interior of the collar can be examined or any particular one of the spokes removed for repairs by simply removing the washer and nut without disturbing or removing any other spoke.

Various modifications in the construction and design of the various parts may be resorted to without departing from the spirit of the invention or sacrificing any of its advantages.

I claim—

1. In a wheel, the combination of a felly, a hub, a collar fixedly secured to the hub and having an annular shoulder and an annular lip portion extending from the shoulder so as to provide a space between the hub and the lip portion, said lip portion having perforations extending through it, spokes connected to the felly and passing through said perforations and having portions for engaging the inner face of the lip portion, the said space permitting end play of the spokes, a washer fitting around the hub and adapted to engage with said lip portion, and a nut fitting around the hub and adapted to bear against the washer.

2. In a wheel, the combination of a felly, a hub, a collar fixedly secured to the hub and having an annular shoulder and an annular lip portion extending from the shoulder so as to provide a space between the hub and the lip portion, said lip portion having perforations extending through it out of line with the center of the hub to permit insertion of the spokes, spokes connected to the felly and passing through said perforations and having heads for engaging the inner face of the lip portion, a washer fitting around the hub and adapted to engage with said lip portion, and a nut fitting around the hub and adapted to bear against the washer.

3. In a wheel, the combination of a felly, a hub, a collar fixedly secured to the hub and having an annular shoulder and an annular lip portion extending from the shoulder so as to provide a space between the hub and the lip portion, said lip portion having perforations extending through it out of line with the center of the hub, there being recesses or seats in the lip portion around the inner ends of the perforations, spokes connected to the felly and passing through said perforations and having portions for engaging said recesses or seats, a washer fitting around the hub and adapted to engage with said lip portion, and a nut fitting around the hub and adapted to bear against the washer.

In testimony whereof I have hereunto set my hand, at Pittsburg, in the county of Allegheny and State of Pennsylvania, this 12th day of February, A. D. 1898.

GEORGE W. MORSE.

Witnesses:
J. N. COOKE,
A. BLAKELEY.